(12) United States Patent
Schnieders (10) Patent No.: US 12,419,224 B2
(45) Date of Patent: Sep. 23, 2025

(54) ROUND BALER

(71) Applicant: Maschinenfabrik Bernard Krone GmbH & Co. KG, Spelle (DE)

(72) Inventor: Felix Schnieders, Lingen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 747 days.

(21) Appl. No.: 17/846,052

(22) Filed: Jun. 22, 2022

(65) Prior Publication Data

US 2022/0408654 A1    Dec. 29, 2022

(30) Foreign Application Priority Data

Jun. 23, 2021    (DE) ..................... 10 2021 116 199.1

(51) Int. Cl.
*A01F 15/08*    (2006.01)
*A01F 15/07*    (2006.01)
*A01F 15/18*    (2006.01)

(52) U.S. Cl.
CPC .......... *A01F 15/0883* (2013.01); *A01F 15/07* (2013.01); *A01F 15/18* (2013.01); *A01F 2015/077* (2013.01)

(58) Field of Classification Search
CPC .................. A01F 15/0883; A01F 15/18; A01F 2015/183; A01F 2015/186; A01F 2015/077; A01F 2015/0785
See application file for complete search history.

(56) References Cited

U.S. PATENT DOCUMENTS

| | | | |
|---|---|---|---|
| 5,134,839 A | 8/1992 | Clostermeyer et al. | |
| 2007/0081878 A1* | 4/2007 | McHale | A01F 15/0883 414/24.5 |
| 2013/0298787 A1* | 11/2013 | Simmons | A01F 15/18 100/76 |
| 2019/0053434 A1* | 2/2019 | Reijersen Van Buuren | A01F 15/0883 |

FOREIGN PATENT DOCUMENTS

| | | | | |
|---|---|---|---|---|
| CN | 105723958 A | * | 7/2016 | ......... A01F 15/0883 |
| DE | 3941707 A1 | * | 6/1991 | ......... A01F 15/0833 |

OTHER PUBLICATIONS

Translation of CN-105723958.*
Translation of DE-3941707.*

* cited by examiner

*Primary Examiner* — Bobby Yeonjin Kim
(74) *Attorney, Agent, or Firm* — Gudrun E. Huckett (57) ABSTRACT

A round baler has a rear door pivotable relative to the frame. A circulating press element defines a press chamber inside the frame for forming crop bales. A tension rocker is pivotable relative to the frame and has a rotatable rocker guide roller guiding the press element. A first pressure element is arranged at frame and rear door and acts between frame and rear door. A second pressure element is arranged at rear door and tension rocker and acts between rear door and tension rocker. At least one of the pressure elements is a linear actor. By length expansion of the first pressure element, rear door and tension rocker are pivotable, wherein the rear door is pivotable upwardly to enable ejection of crop bales. The rear door is pivotable downwardly by length expansion of the second pressure element. A method for operating the round baler is provided.

11 Claims, 4 Drawing Sheets

ROUND BALER

BACKGROUND OF THE INVENTION

The present invention concerns a round baler with a frame, a rear door pivotable relative thereto about a door axis, an endless circulatingly drivable press element by means of which, inside the frame, a press chamber for forming a crop bale is definable at least partially, a tension rocker that is pivotable relative to the frame about a rocker axis and comprises at least one rotatable rocker guide roller which guides the press element, a first pressure element acting between the frame and the rear door, and a second pressure element acting on the tension rocker.

The present invention concerns also a method for operating a round baler with a frame, a rear door pivotable relative thereto about a door axis, an endless circulatingly drivable press element by means of which, inside the frame, a press chamber for forming a crop bale is definable at least partially, a tension rocker that is pivotable relative to the frame about a rocker axis and comprises at least one rotatable rocker guide roller which guides the press element, a first pressure element acting between the frame and the rear door, and a second pressure element acting on the tension rocker.

Harvesting machines are used in agriculture in order to pick up and optionally further process crop such as e.g. hay or straw. The further processing can encompass inter alia comminution, pressing and/or packaging or wrapping the crop. In case of a round baler, the crop is pressed to round crop bales that can be subsequently wrapped with a tying material. As tying material, cords, nets, or films (e.g. in case of grass) can be employed wherein the latter can be applied also outside of the baler in a bale wrapping device that is separated therefrom. The crop is initially picked up from the ground (normally by a pick-up) and further transferred to a conveying rotor or cutting rotor that conveys the crop through a feed channel to the bale formation chamber or press chamber where the actual compression occurs. Here, press elements are acting on the crop that also act as conveying elements and generate a circulating movement of the crop.

In case of balers with variable chamber, the effective size of the chamber is adjusted to the increasing quantity of crop, wherein at least one endlessly circulating press element that is flexible as a whole defines a predominant part of the press chamber. The press element can be embodied e.g. as a rod-chain conveyor with circulating chains and rods extending therebetween or can comprise one or normally several press belts or bands. The respective press belt is guided across a plurality of rotatable guide rollers or tension rollers so that it is held under tension and, in operation of the round baler, is driven in accordance with a circulating movement. The finish-shaped round bale is ejected at the rear for which purpose a rear door must be opened. For optimal guidance of the press element, the latter is guided in general above the rear door across at least one guide roller with which the rear door might collide upon opening. In addition, at the rear door at least one guide roller is often supported by means of which the press element is also guided for which reason, upon opening of the rear door, an insufficient tension in the press element and a slip resulting therefrom might occur. Therefore, the aforementioned guide roller above the rear door is often supported at a pivotable rocker. Upon opening of the rear door, this rocker is also pivoted whereby the press element remains sufficiently tensioned. The movement of rocker and rear door must be temporally coordinated in order to avoid a slip of the press element or a collision between the rocker and the rear door. In the prior art, the rear door and the rocker have separate drives that connect them respectively to the frame of the round baler. The respective drive can comprise e.g. a double-action hydraulic cylinder by means of which an active pivoting in both directions is possible. The temporal coordination of the drives is controlled by a superior control unit.

Object of the invention is making available an improved mechanism for opening a press chamber of a round baler.

SUMMARY OF THE INVENTION

The object is solved by a round baler that is characterized in that the second pressure element acts between the rear door and the tension rocker and at least one pressure element is configured as linear actor, wherein, by length expansion of the first pressure element, the rear door and the tension rocker are pivotable in order to enable an ejection of the crop bale by upward pivoting of the rear door, and the rear door is pivotable downwardly by length expansion of the second pressure element.

Advantageous embodiments can be taken from the dependent claims.

For this purpose, a round baler is provided, with a frame, a rear door pivotable relative thereto about a door axis, an endless circulatingly drivable press element by means of which, inside the frame, a press chamber for forming a crop bale is definable at least partially, a tension rocker that is pivotable relative to the frame about a rocker axis and comprises at least one rotatable rocker guide roller which guides the press element, a first pressure element acting between the frame and the rear door, and a second pressure element acting on the tension rocker.

The round baler is configured for pressing agricultural crop to round bales wherein the actual pressing process is realized in a press chamber. The agricultural crop can be in particular stalk material such as grass, straw or hay. The term "round baler" includes expressly in this context also machines that, in addition to pressing of the crop to bales, also perform tying or packaging of the bales. The crop can be picked up by a pick-up and conveyed by a conveying device, e.g. a conveying rotor, father in the direction of the press chamber. Instead of a simple conveying device or in addition thereto, a cutting device can be provided that not only conveys the crop but also cuts it. In any case, a feed channel is provided through which the crop flow passes prior to reaching the press chamber. The round baler can be embodied self-propelled or can be provided to be pulled by a tractor.

The frame forms in a way the basic structure of the round baler and imparts it with stability as a whole. At the frame, by means of a suitable suspension, also the wheels of the round baler are attached, likewise—in case of a pulled configuration—a hitch. Also, the frame typically comprises a housing that shields the inwardly positioned parts, namely the press chamber, in outward direction. The rear door that is connected pivotably to the frame closes normally such a housing to the rear, i.e., opposite to the travel direction. By pivoting about the door axis, the rear door can be opened or closed.

The press chamber is at least is partially definable or delimitable by an endless circulatingly driven press element. The press element delimits the press chamber in which the crop bale is formed and defines thus its effective size at least partially. It can be embodied in particular as one or a plurality of endless press belts or bands, but alternatively also e.g. as a rod-chain conveyor. In any case, it is drivable in circulation, for which purpose it is guided e.g. across a plurality of guide rollers or tension rollers of which at least one is connected to a drive. The respective guide roller is in general embodied with rotational symmetry, however, its surface, as far as it is coming into contact with the press element, is not necessarily smooth but can comprise suitable structures for engaging the press element. On the one hand, each guide roller serves for guiding the press element and, on the other hand, in general also for maintaining however a tension (i.e., tensile stress) in the press element. This tension, in turn, serves to prevent slip between press element and guide rollers, i.e., ensure the proper drive action.

At least one of these guide rollers, which are here referred to as rocker guide roller, is supported on a tension rocker that is pivotable about a rocker axis in relation to the frame. The rocker axis like the door axis extend in general parallel to the transverse axis of the round baler. In general, the tension rocker, in relation to a vertical axis of the round baler, is arranged at least partially above the rear door. It guides the press element, i.e., the press element is resting on the respective rocker guide roller, so that upon its circulating movement it is guided (at least partially) by the rocker guide roller. An object of the rocker guide roller as well as of the tension rocker as a whole is normally to hold the press element under tension and to prevent slip in different states of the round baler.

Moreover, the round baler comprises at least two pressure elements. As will be explained still in the following, each pressure element is configured to generate at least temporarily a pressure force (in contrast to a tensile force). A first pressure element acts between the frame and the rear door, i.e., it can generate a pressure force (more precisely: a force pair) between frame and rear door. A second pressure element acts on the tension rocker and can generate a pressure force on it. The first pressure element can act directly on the frame and the rear door or indirectly by means of at least one intermediately arranged additional element that transmit the pressure force. If such an element is provided, it can also optionally diverge the pressure force or (by lever action) reinforce or weaken it.

According to the invention, the second pressure element is acting between the rear door and the tension rocker and at least one pressure element is configured as a linear actor, wherein, by length expansion of the first pressure element, the rear door and the tension rocker are pivotable in order to enable an ejection of the crop bale by upward pivoting of the rear door and, by length expansion of the second pressure element, the rear door is pivotable downwardly. The second pressure element can also act directly or indirectly on the rear door and the tension rocker. Since the first pressure element acts between the frame and the rear door and the second pressure element between the rear door and the tension rocker, the two pressure elements are arranged kinematically or with respect to the force flow essentially in series. One could also say that the tension rocker is supported by means of the second pressure element at the rear door and thus indirectly, via the first pressure element, at the frame.

By length expansion of the first pressure element, the rear door and the tension rocker are pivotable, i.e., they can carry out a pivot movement about their respective pivot axis when the first pressure element is expanded. The first pressure element is connected—normally directly, optionally also indirectly—by a frame connection point (for example, a frame pivot bearing) to the frame and by means of a first door connection point to the rear door. Between these connection points, the first pressure element can expand or contract in respect to the length. Correspondingly, the second pressure element (directly or indirectly) is connected by a second door connection point to the rear door and by means of a rocker connection point to the tension rocker; between these connection points, it can expand and contract. The expansion of the first pressure element corresponds to the described pivot movement of the rear door and—due to the coupling through the second pressure element—to a pivot movement of the tension rocker. Of course, the second pressure element must transmit at least during this pivot movement a pressure force between the rear door and the tension rocker. This can thus hold true in particular when the tension present in the press element generates via the rocker guide roller an opposite force. The upward pivoting of the rear door corresponds to an opening thereof which is necessary when a finish-shaped crop bale is to be ejected. The additionally occurring pivoting of the tension rocker can serve in particular to avoid a collision between the rear door and the tension rocker and/or to maintain by means of the rocker guide roller(s) a tension in the press element. By length expansion of the second pressure element, the rear door can be pivoted downwardly which corresponds to closure of the rear door. In this context, of course, a length contraction of the first pressure element that is interposed between rear door and frame occurs at the same time. The second pressure element can be supported during its expansion at the tension rocker that normally, as already mentioned above, is loaded via the at least one rocker guide roller by the tension in the press element. Possibly, the tension rocker additionally can have correlated therewith a stop by means of which it is supported at the frame.

In this context, at least one pressure element is configured as a linear actor, which e.g. can be electrically, hydraulically, or pneumatically operable. In any case, the linear actor can be controlled so that the length expansion of the corresponding pressure element can be actively influenced. As will still be explained in the following, the invention can be realized with only one linear actor while the other pressure element can be configured as a passive component.

It is possible that at least one pressure element is configured e.g. as a double-action cylinder. Alternatively or additionally, it is in particular preferred that at least one pressure element is configured as a single-action (single-acting) cylinder, normally as a hydraulic cylinder. Correspondingly, this pressure element can apply a static or dynamic pressure force and actively expand but it cannot actively contract but only passively, i.e., due to external force action. Generating a static tension force that counteracts expansion of the pressure element by outer forces may be possible. As is already suggested by the term "pressure element", it is preferred that also the other pressure element, even if it is not embodied as a single-action (single-acting) cylinder, in the installed state in the round baler transmits pressure forces while tension forces are transmitted at most statically. In this case, the contraction of both pressure elements is possible only passively, i.e., they can be compressed by external forces but cannot contract actively. This means that the round baler according to the invention can be realized without a double-action cylinder and enables still the required pivoting movements of the rear door as well as of the tension rocker. Despite this comparatively simple and inexpensive mechanism, it has been found that, due to the direct connection of the rear door to the tension rocker via the second pressure element, an optimal coordination of the two pivot movements is possible that ensures in particular a satisfactory tension in the press element.

According to an embodiment, a pressure element is configured as pressure spring. This can be here in particular a mechanical spring, for example, a coil spring, even though a use of a pneumatic spring in the context of the invention is not precluded. In any case, the pressure spring acts as a purely "passive" element, because it must not (or cannot) be controlled in any state of the movement cycle. The control is limited in this context to a single pressure element that is designed as a single-action cylinder. The length contraction of the cylinder is driven in this context at least partially by the length expansion of the pressure spring.

Preferably, the first pressure element is configured as a single-action cylinder. This configuration has been found to be advantageous because in this way at least the upward pivoting of the rear door can be controlled exactly, namely by the controllable expansion of the cylinder. The same applies essentially to the downward movement of the rear door because also the contraction of the cylinder is controllable or can be controlled, even when the cylinder does not perform any work. In this configuration, the second pressure element, as described above, can be configured as a pressure spring.

As an alternative or in addition to a single-action cylinder, in the above embodiments e.g. also a hydraulic cylinder conceptualized with double action can be employed in which however only a first cylinder side used for the length expansion is loaded actively with liquid while the other second cylinder side is utilized passively in order to store thereat hydraulic liquid when it is flowing out of the first cylinder side upon passive length contraction. This means that this cylinder comprises two hydraulic connectors, like a double-action acting cylinder, but is effectively operated like a single-action cylinder.

According to another advantageous embodiment, both pressure elements are embodied as single-action cylinders. This embodiment is advantageous in that, by the control of the cylinders, the position of the rear door relative to the frame as well as the position of the tension rocker relative to the rear door can be actively influenced, and thus also the position of the tension rocker relative to the frame, wherein in general the force action on the part of the press element affects the aforementioned positions. A similar effect of control and precision cannot, or at least is more difficult, to achieve when using a pressure spring. On the other hand, this solution is more complex and associated with higher costs because a second cylinder is necessary that requires e.g. its own hydraulic connector and that must also to be controlled in a coordinated fashion with the other cylinder.

According to preferred embodiment, the tension rocker comprises a rearward rocker section arranged behind the rocker axis in relation to a longitudinal axis of the round baler, wherein the second pressure element is acting between the rear door and the rearward rocker section, wherein, by length expansion of the first pressure element, the rear door and the rearward rocker section are pivotable upwardly. The rearward rocker section, which can also be embodied as a rearward rocker arm, is arranged behind the rocker axis in relation to the longitudinal axis, one could also say: opposite to the travel direction. The second pressure element is attached in such a way to the rearward rocker section that, upon upward pivoting of the rear door, a force or a torque is transmitted that also effects an upward pivoting of the rearward rocker section. In this way, in particular a collision of the rear door with the rearward rocker section can be avoided, i.e., the rearward rocker section can evade essentially the rear door. The term "rearward rocker section" is not to be interpreted such that mandatorily a central or forward rocker section must be present. Possibly, the tension rocker can be formed primarily or completely by the rearward rocker section.

Preferably, the rearward rocker section comprises a rotatable rearward rocker guide roller which guides the press element at its inner side. Since the rearward rocker section in relation to the longitudinal axis is arranged behind the rocker axis, this also applies to the rearward rocker guide roller. It guides the press element at its inner side, i.e., is arranged at the inner side of the pressure element that as a whole is loop-like closed, i.e., in the space that is enclosed by the press element. Upon upward pivoting of the rearward rocker section, the rearward rocker guide roller presses at the inner side against the press element, wherein normally a force that at least partially acts upwardly is transmitted to the press element and contributes to its tension.

According to a typical configuration, the rear door comprises at least one rotatable door guide roller which guides the press element at its inner side. This means that the rear door serves not only for closing a housing or for shielding the press chamber to the rear but it serves also, as does the tension rocker, for guiding and tensioning the press element. Of course, the rear door can also have a plurality of door guide rollers. Due to the door guide roller, a further force transmission to the rear door is realized, namely by means of the press element, which also influences the pivoting process. In particular, the tension of the press element can lead to the own weight of the rear door to be insufficient for pivoting it downwardly. The first pressure element can generate no supporting (dynamic) tension force. Thus, here a downward push by the second pressure element is required in order to trigger the pivoting action. Also, in this embodiment a coordination of the pivot movements of rear door and tension rocker is particularly important because pivoting of the tension rocker occurring too late might lead to a loss of tension in the press element and a possible slip. The corresponding coordination is however significantly facilitated by the coupling according to the invention via the second pressure element.

Advantageously, the tension rocker cannot only be used for tensioning or guiding the press element but also for ejecting the finished crop bale. With a rearward rocker section as described above, this is hardly realizable however. Therefore, a preferred embodiment provides that the tension rocker comprises a forward rocker section which is arranged in front of the rocker axis along the longitudinal axis and provided with an ejector element that is configured to act upon pivoting of the tension rocker at least indirectly on the crop bale in order to eject it. In this context, that pivoting of the tension rocker is meant that is coupled to the upward pivoting of the rear door due to the action of the second pressure element. In particular, the ejector element can be configured to act at least indirectly on the crop bale upon upward pivoting of the rearward rocker section. If present, the forward and the rearward rocker sections are positioned in relation to the rocker axis (along the longitudinal axis) opposite each other, i.e., the first one is positioned in front of the rocker axis and the latter behind it. Correspondingly, upon upward pivoting of the rearward rocker section, a downward pivoting of the forward rocker section occurs, and vice versa. By suitable arrangement of the rocker sections relative to each other, it can be achieved in particular that a part of the forward rocker section at which the ejector element is arranged not only moves in downward direction but also to the rear upon upward pivoting of the rearward rocker section. With the corresponding movement, the ejector element acts directly or indirectly on the crop bale so that the latter is pushed to the rear which at least assists in ejection. Even though the forward rocker section is used normally in combination with the rearward rocker section, it is in principle conceivable that the tension rocker comprises a forward but no rearward rocker section.

It would possibly be conceivable that the ejector element circumvents the press element or passes through a cutout in the press element in order to act directly on the crop bale. This is however difficult to realize in particular for a press element with one or a plurality of press belts. It is therefore preferred that the ejector element is configured to act on the press element for ejection of the crop bale. This means that the ejector element acts on the press element which is in contact with a round bale and exerts thus a force on the round bale. It pushes the round bale thus indirectly by means of the press element. The press element is in contact with its exterior side with the round bale and the ejector element is arranged at the inner side of the press element.

Preferably, the ejector element is designed as a rotatable ejector roller. The ejector roller is supported rotatably at the forward rocker section. Upon contact with the press element, it can rotate in order to follow its movement. The ejector roller could also be itself driven which in general is to be realized in an unnecessarily complex manner however.

The forward rocker section furthermore can comprise at least one rotatable forward rocker guide roller which guides the press element at its exterior side. This means that this rocker guide roller is resting against the press element at its exterior side. This, in turn, has the result that upon increasing tension in the press element, e.g. by the press chamber filling up, it is loaded with an outwardly acting force (in relation to the press element) that normally comprises an upwardly oriented component. The torque resulting therefrom in relation to the rocker axis is oriented in the same direction as that which results from the force on the rearward rocker guide roller, if the latter is present. This means that both torques act in this case additively toward a pivot movement of the rocker which corresponds normally to a downward pivoting of the rearward rocker section and an upward pivoting of the forward rocker section.

The object is furthermore solved by a method for operating a round baler with a frame, a rear door pivotable relative thereto about a door axis, an endless circulatingly drivable press element by means of which, inside the frame, a press chamber for forming a crop bale is definable at least partially, a tension rocker that is pivotable relative to the frame about a rocker axis and comprises at least one rotatable rocker guide roller which guides the press element, a first pressure element acting between the frame and the rear door, and a second pressure element acting on the tension rocker.

According to the invention, the second pressure element acts between the rear door and the tension rocker and at least one pressure element is configured as a linear actor, wherein the method comprises the following steps:
  pivoting of the rear door and of the tension rocker by length expansion of the first pressure element, wherein the rear door is pivoted upwardly;
  ejection of the crop bale; and
  downward pivoting of the rear door by length expansion of the second pressure element.

The mentioned terms have already been explained above in relation to the round baler according to the invention and are therefore not explained again. Advantageous embodiments of the method according to the invention correspond to those of the round baler according to the invention.

BRIEF DESCRIPTION OF THE DRAWINGS

In the following, the invention will be described with the aid of the Figures. The Figures are only examples and do not limit the general concept of the invention.

PREFERRED EMBODIMENTS

Figure 1:
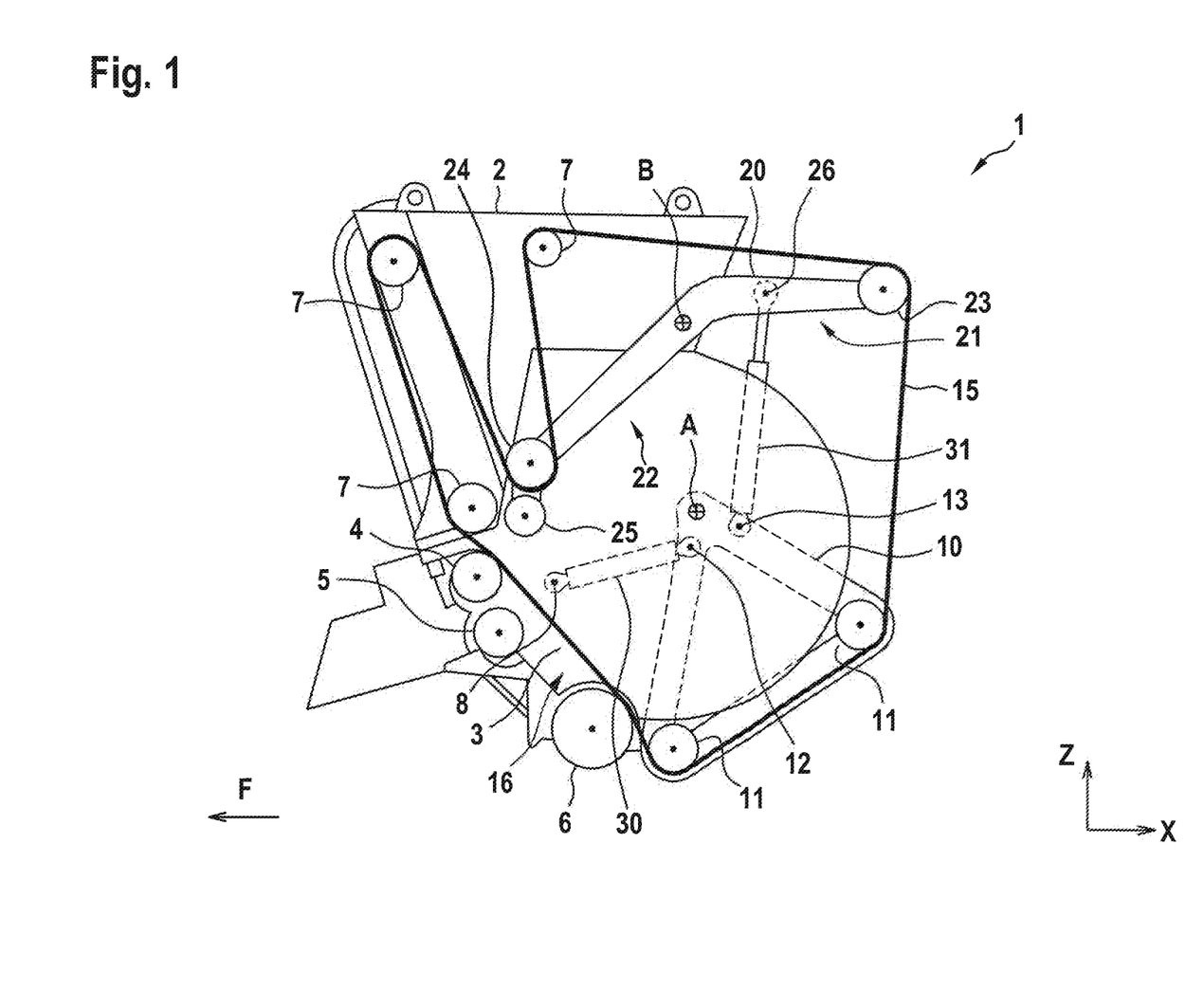
FIG. 1 shows a section illustration of a round baler according to the invention according to a first embodiment of the invention with empty press chamber.

FIG. 1 shows a section illustration of a round baler 1, more precisely said: of parts thereof, according to a first embodiment. For reasons of simplification, various elements that are not subject matter of the invention have been omitted. These include in particular wheels on which the round baler 1 is supported, feed elements (such as a pick-up and a conveying rotor) or a hitch, by means of which the round baler 1 can be connected to a tractor. However, this could also concern a self-propelled round baler 1.

A frame 2 can be seen which provides for structural stability and has a housing, not illustrated here. Important parts of the frame 2 are sidewalls 3 of which each one extends in the direction of a longitudinal axis X as well as in the direction of a vertical axis Z of the round baler 1. The rearwardly pointing longitudinal axis X is antiparallel to the travel direction F. In the section illustrations of the Figures, only one of the sidewalls 3 that are spaced apart from each other along the transverse axis is visible.

At the frame 1, a plurality of rolls or rollers are rotatably supported. In a forward region, two press rolls 4, 5 can be seen as well as, farther down as well as to the rear thereof, a starter roll 6. In addition, a plurality of frame guide rollers 7 can be seen across which an endless press element 15 is guided. In this case, the latter is formed by a plurality of press belts which are drivable in circulation by one or a plurality of frame guide rollers 7 which act as drive elements. Alternatively, the press element can be formed e.g. by a single press belt. The press element 15 is also guided across two door guide rollers 11 of a rear door 10 as well as across two rocker guide rollers 23, 24 of a tension rocker 20.

The rear door 10 is pivotable relative to the frame about a door axis A. The door guide rollers 11 are positioned approximately the same distance to the door axis A. Both door guide rollers 11 are resting, like the frame guide rollers 7, against the press element 15 at its inner side. The tension rocker 20 in relation to the vertical axis Z is arranged primarily above the rear door 10 and pivotable about the rocker axis B in relation to the frame. The rearward rocker guide roller 23 is arranged at a rear rocker section 21 which in relation to the longitudinal axis X is arranged behind the rocker axis B. The door axis A as well as the rocker axis B extend parallel to the transverse axis of the round baler 1 and thus perpendicular to the drawing plane of the Figures. At a forward rocker section 22 arranged in front of the rocker axis B in relation to the longitudinal axis X, on the one hand, a forward rocker guide roller 24 that is resting against the press element 15 at its exterior side is arranged and, on the other hand, an ejector roller 25 which in FIG. 1 is held at a distance from the press element 15. A first single-action cylinder 30 functioning as a first pressure element is connected by a frame pivot bearing 8 to the side wall 3 and also by a first door pivot bearing 12 to the rear door 10. A second cylinder 31 functioning as a second pressure element and also with single action is connected by a second door pivot bearing 13 to the rear door 10 as well as by a rocker pivot bearing 26 to the rearward rocker section 21. Both cylinders 30, 31 are presently embodied as hydraulic cylinders and can only exert a pressure force between their respective pivot bearings 8, 12, 13, 26.

As a whole, the guide rollers 7, 11, 23, 24 hold the press element 15 under tension. The press rolls 4, 5, the starter roll 6 as well as the press element 15 define together a press chamber 16 of variable size in which successively a crop bale 50 is formed. In FIG. 1, the press chamber 16 is empty wherein the press element 15 is guided immediately across an upper press roll 4 as well as starter roll 6. Also, the rear door 10 is lowered and thus closed. The first cylinder 30 can be switched in this situation to a pressureless state and has its minimal length, i.e., it is completely contracted. The tension rocker 20 is in a position in which the rearward rocker section 21 extends approximately horizontally or slightly lifted. The second cylinder 31 is extended, possibly to its maximum length, i.e., it is (as needed, completely) expanded. It exerts, on the one hand, a force on the rear door 10 that pushes it in the direction of the lowered position and, on the other hand, a force on the rearward rocker section 21. From the latter force a torque results due to which the tension rocker 20 holds the press element 15 under tension by means of the rearward rocker guide roller 23 as well as the forward rocker guide roller 24. Insofar as the force of the second cylinder 31 is insufficient to hold the rear door 10 in the lowered position, the rear door 10 optionally can also be secured by a locking element, not illustrated here.

In operation of the round baler 1, crop is conveyed into the press chamber 16 and is successively formed there to a crop bale 50. The latter grows little by little until it has reached a maximum size illustrated in FIG. 2. In order to enclose the growing crop bale 50, an ever increasing proportion of the press element 15 is arranged about the press chamber 16. This is compensated little by little by a pivot movement of the tension rocker 20 upon which the rearward rocker section 21 with a rearward rocker guide roller 23 is moved downwardly and the forward rocker section 21 with the forward rocker guide roller 24 moves upwardly. Correspondingly, the second cylinder 31 contracts little by little which however is occurring passively insofar as the second cylinder 31 does not create tension forces. With completely filled press chamber 16, as illustrated in FIG. 2, both cylinders 30 and 31 are fully contracted and have thus assumed their minimal length.

The finish-formed crop bale 50 is subsequently ejected to the rear. For this purpose, the rear door 10 is pivoted upwardly in that, by means of the first cylinder 30, a pressure force is exerted wherein the first cylinder 30 is extended. Since the tension rocker 20 is coupled by the completely contracted second cylinder 31 to the rear door 10, it is forcibly also pivoted wherein the rearward rocker section 21 moves upwardly and the forward rocker section 22 downwardly. In this way, a collision between the rear door 10 and the tension rocker 20 is prevented and, in addition, the tension in the press element 15 maintained. The tension rocker 20 pivots so far that the rearward rocker section 21 moves past the position illustrated in FIG. 1 into the position illustrated in FIG. 3. Correspondingly, the forward rocker section 22 pivots downwardly and toward the front until the ejector roller 25 is pushed against a section of the press element 15 that is in contact with the crop bale 50. Thus, the ejector roller 25 by means of the press element 15 exerts a proportionate force directed toward the rear on the crop bale 50 so that its ejection is triggered or at least assisted.

Figure 3:
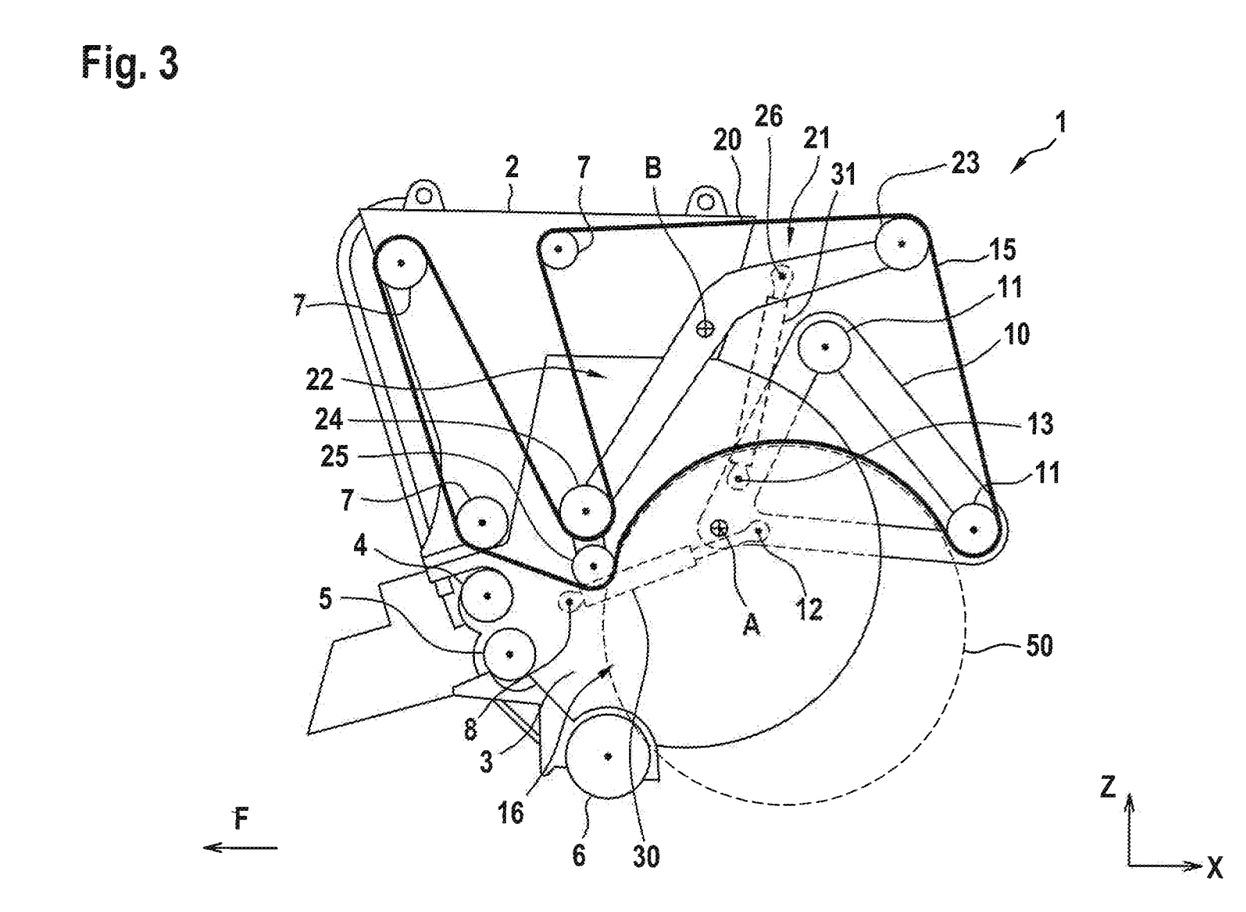
FIG. 3 shows a section illustration of the round baler of FIG. 1 upon ejection of a crop baler.

From the open position illustrated in FIG. 3, the rear door 10 possibly cannot pivot downwardly again by its own weight alone, or only with a delay, because the tension in the press element 15 can counteract this pivot process. In order to close the rear door 10 in an effective manner, on the one hand, the pressure in the first cylinder 30 is reduced and, on the other hand, a pressure force is exerted by means of the second cylinder 31 by means of which the rear door 10 is pushed downwardly. During the further course of closing, the torque which is acting due to the tension in the press element 15 through the rocker guide rollers 23, 24 on the tension rocker 20 ensures that the tension rocker 20 pivots back again into the position illustrated in FIG. 1.

Figure 2:
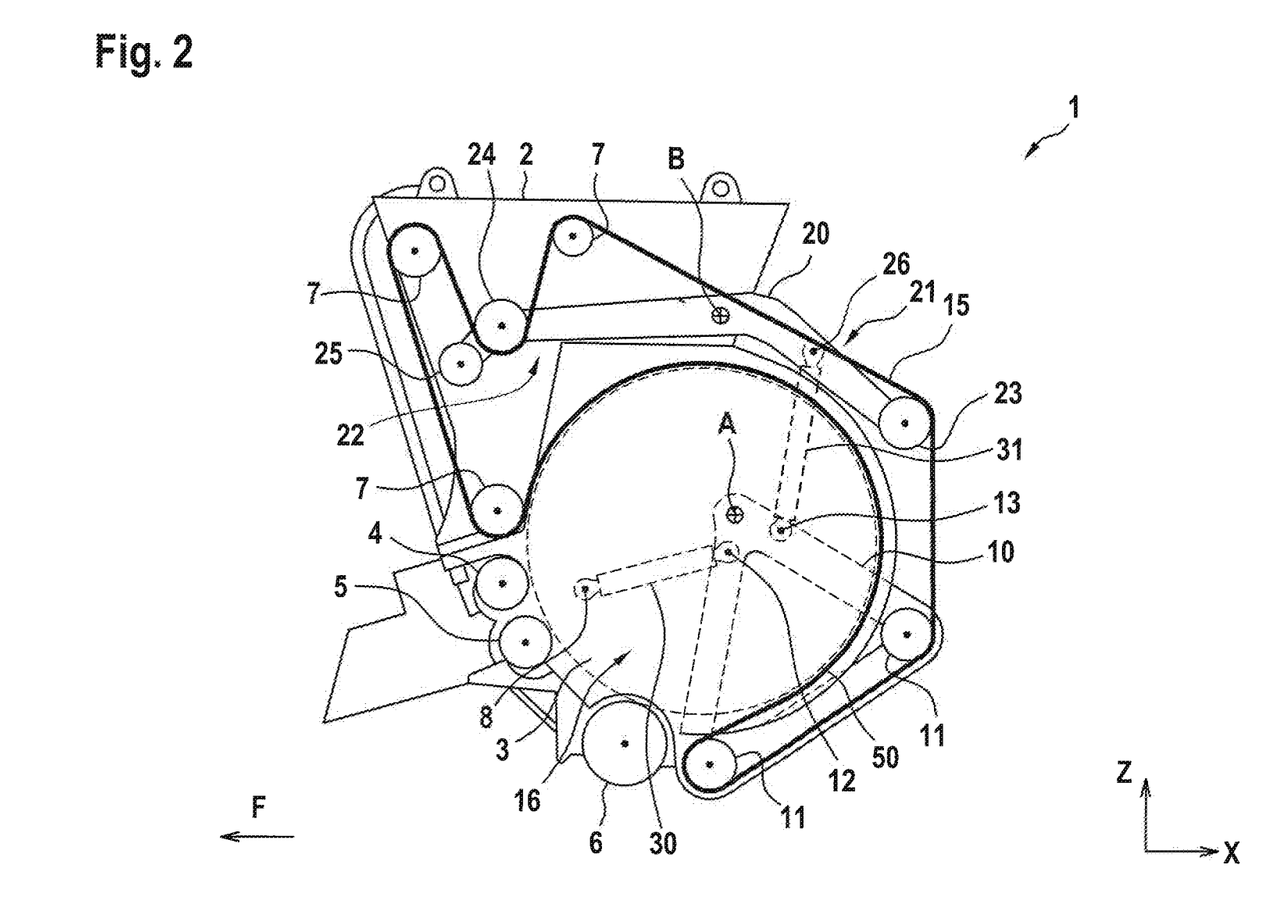
FIG. 2 shows a section illustration of the round baler of FIG. 1 with filled press chamber.
Figure 4:
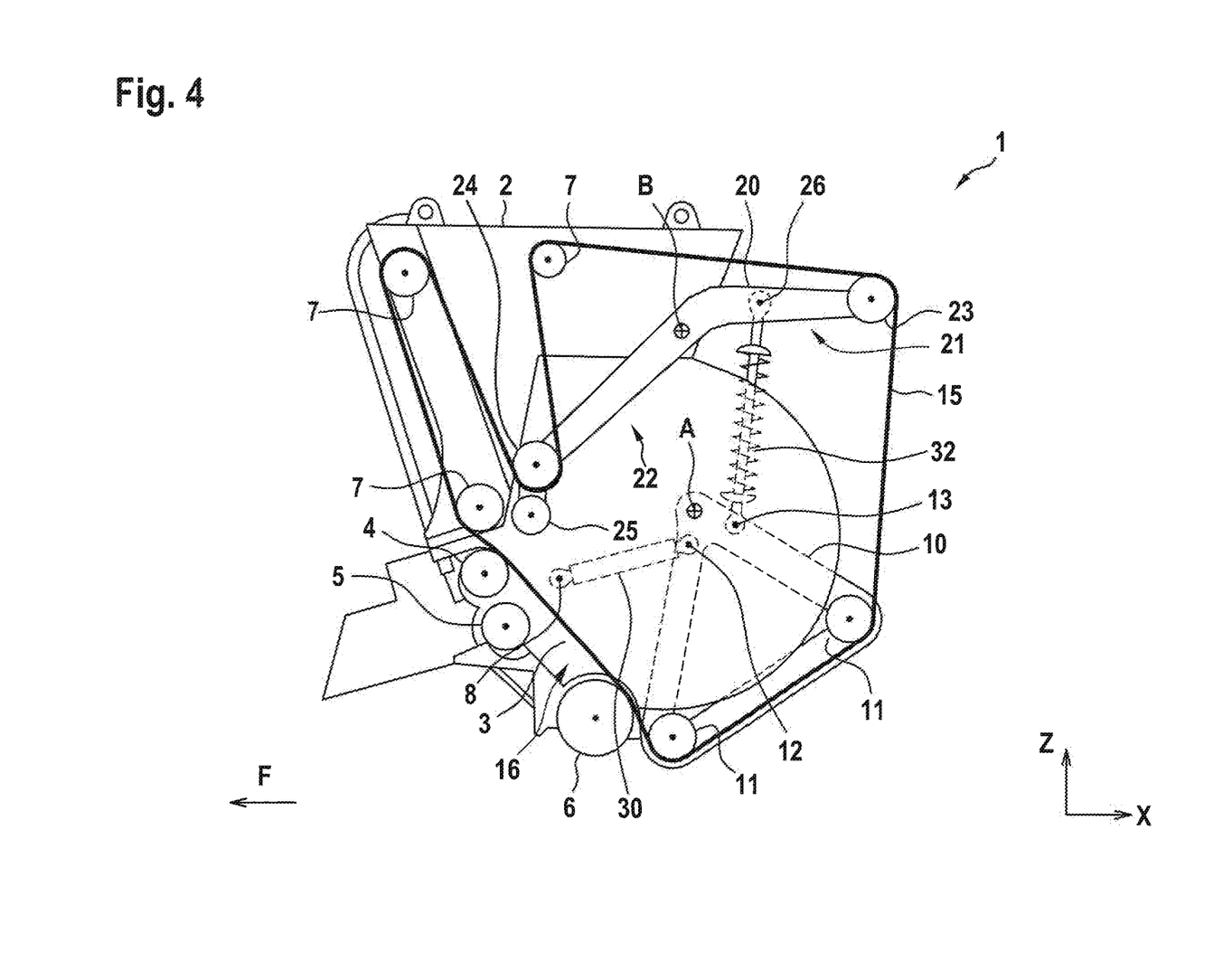
FIG. 4 shows a section illustration corresponding to FIG. 1 of a round baler according to the invention according to a second embodiment.

FIG. 4 shows a second embodiment of a round baler according to the invention that coincides mostly with the embodiment illustrated in FIGS. 1 to 3 and insofar is not explained again. However, in this case instead of the second cylinder 31 a pressure spring 32 is provided as a second pressure element. During growth of the crop bale 50, the tension rocker 20, as described above, pivots wherein the pressure spring 32 between tension rocker 20 and rear door 10 is compressed. When the rear door 10 in this embodiment is to be opened, a pressure force is exerted again via the first cylinder 30 and the first cylinder 30 expands, wherein the tension rocker 20 is also pivoted by force transmission via the rear door 10 and the pressure spring 32. This can cause a length change of the pressure spring 32; in the end, however, a similar position of the tension rocker 20 as in FIG. 3 is achieved. The pressure spring 32 is compressed relative to FIG. 4 so that a torque is exerted on the rear door 10. As soon as the pressure force is reduced on the part of the first cylinder 30, the pressure spring 32 expands, the cylinder 30 contracts, and the rear door 10 pivots downward.

What is claimed is:

1. A round baler comprising:
   a frame;
   a rear door pivotable relative to the frame about a door axis;
   an endless circulatingly drivable press element configured to define at least partially a press chamber inside the frame for forming a crop bale;
   a tension rocker pivotable relative to the frame about a rocker axis, wherein the tension rocker comprises at least one rotatable rocker guide roller configured to guide the press element;
   a first pressure element arranged at the frame and at the rear door and acting between the frame and the rear door;
   a second pressure element arranged at the rear door and at the tension rocker and acting between the rear door and the tension rocker;
   wherein at least one of the first and second pressure elements is a linear actor;
   wherein the rear door and the tension rocker are configured to pivot by a length expansion of the first pressure element, and wherein the rear door is configured to pivot upwardly by the length expansion of the first pressure element to enable an ejection of the crop bale from the press chamber;

wherein the rear door is configured to pivot downwardly by a length expansion of the second pressure element;

wherein the first pressure element is a single-acting cylinder and wherein the second pressure element is a single-acting cylinder.

2. A round baler comprising:

a frame;

a rear door pivotable relative to the frame about a door axis;

an endless circulatingly drivable press element configured to define at least partially a press chamber inside the frame for forming a crop bale;

a tension rocker pivotable relative to the frame about a rocker axis, wherein the tension rocker comprises at least one rotatable rocker guide roller configured to guide the press element;

a first pressure element arranged at the frame and at the rear door and acting between the frame and the rear door;

a second pressure element arranged at the rear door and at the tension rocker and acting between the rear door and the tension rocker;

wherein at least one of the first and second pressure elements is a linear actor;

wherein the rear door and the tension rocker are configured to pivot by a length expansion of the first pressure element, and wherein the rear door is configured to pivot upwardly by the length expansion of the first pressure element to enable an ejection of the crop bale from the press chamber;

wherein the rear door is configured to pivot downwardly by a length expansion of the second pressure element;

wherein the tension rocker comprises a rearward rocker section arranged behind the rocker axis in relation to a longitudinal axis of the round baler, wherein the second pressure element acts on the rear door and on the rearward rocker section, wherein the rear door and the rearward rocker section are pivotable upwardly by the length expansion of the first pressure element.

3. The round baler according to claim 2, wherein at least one of the first and second pressure elements is a single-acting cylinder.

4. The round baler according to claim 2, wherein one of the first and second pressure elements is a pressure spring.

5. The round baler according to claim 2, wherein the first pressure element is a single-acting cylinder.

6. The round baler according to claim 2, wherein the rearward rocker section comprises a rotatable rearward rocker guide roller configured to guide the press element at an inner side thereof.

7. The round baler according to claim 2, wherein the rear door comprises at least one rotatable door guide roller configured to guide the press element at an inner side thereof.

8. A round baler comprising:

a frame;

a rear door pivotable relative to the frame about a door axis;

an endless circulatingly drivable press element configured to define at least partially a press chamber inside the frame for forming a crop bale;

a tension rocker pivotable relative to the frame about a rocker axis, wherein the tension rocker comprises at least one rotatable rocker guide roller configured to guide the press element;

a first pressure element arranged at the frame and at the rear door and acting between the frame and the rear door;

a second pressure element arranged at the rear door and at the tension rocker and acting between the rear door and the tension rocker;

wherein at least one of the first and second pressure elements is a linear actor;

wherein the rear door and the tension rocker are configured to pivot by a length expansion of the first pressure element, and wherein the rear door is configured to pivot upwardly by the length expansion of the first pressure element to enable an ejection of the crop bale from the press chamber;

wherein the rear door is configured to pivot downwardly by a length expansion of the second pressure element;

wherein the tension rocker comprises a forward rocker section arranged in front of the rocker axis in relation to a longitudinal axis of the round baler, wherein the forward rocker section comprises an ejector element configured to act at least indirectly on the crop bale to eject the crop bale from the press chamber upon pivoting of the tension rocker by the length expansion of the first pressure element.

9. The round baler according to claim 8, wherein the ejector element is configured to act on the press element for ejecting the crop bale.

10. The round baler according to claim 9, wherein the ejector element is a rotatable ejector roller.

11. The round baler according to claim 8, wherein the forward rocker section comprises at least one rotatable forward rocker guide roller configured to guide the press element at an exterior side thereof.

* * * * *